United States Patent
Liu et al.

(10) Patent No.: US 10,201,957 B2
(45) Date of Patent: Feb. 12, 2019

(54) DYE RECEIVING LAYER COMPOSITION, DYE RECEIVING SUBSTRATE AND METHOD OF FABRICATING THE SAME

(71) Applicant: Chien Hwa Coating Technology, Inc., Hsinchu (TW)

(72) Inventors: Tze-Wei Liu, Hsinchu (TW); Hsing-Yi Chen, Hsinchu (TW); Ying-Kwi Qiu, Hsinchu (TW); Kuan-Lun Huang, Hsinchu (TW)

(73) Assignee: Chien Hwa Coating Technology, Inc., Hsinchu (TW)

( * ) Notice: Subject to any disclaimer, the term of this patent is extended or adjusted under 35 U.S.C. 154(b) by 0 days.

(21) Appl. No.: 15/642,320

(22) Filed: Jul. 5, 2017

(65) Prior Publication Data
US 2018/0229484 A1 Aug. 16, 2018

(30) Foreign Application Priority Data
Feb. 16, 2017 (TW) .............................. 106105129 A

(51) Int. Cl.
*B41M 5/52* (2006.01)
*B32B 27/30* (2006.01)
(Continued)

(52) U.S. Cl.
CPC .............. *B32B 27/304* (2013.01); *B32B 7/12* (2013.01); *B32B 27/10* (2013.01); *B32B 37/1284* (2013.01); *B32B 37/203* (2013.01); *B41M 5/52* (2013.01); *C09J 5/00* (2013.01); *B32B 2250/02* (2013.01); *B32B 2317/12* (2013.01); *B32B 2327/06* (2013.01); *B32B 2559/00* (2013.01); *B41M 5/42* (2013.01); *B41M 5/5227* (2013.01);
(Continued)

(58) Field of Classification Search
CPC .......... B41M 5/50; B41M 5/506; B41M 5/52; B41M 5/5254; B41M 2205/02; B41M 2205/38; B41M 2205/04
USPC ......................................................... 503/227
See application file for complete search history.

(56) References Cited

U.S. PATENT DOCUMENTS 3,775,521 A 11/1973 Yamamoto et al.
5,759,738 A * 6/1998 Tsuno et al. ............. G03C 8/52
430/200
(Continued)

FOREIGN PATENT DOCUMENTS

EP 0386262 A1 9/1990
EP 1974942 A1 10/2008
(Continued)

*Primary Examiner* — Bruce H Hess
(74) *Attorney, Agent, or Firm* — CKC & Partners Co., Ltd.

(57) ABSTRACT

A dye receiving sheet includes a substrate and at least one dye receiving layer on one side of the substrate. The dye receiving layer includes: (a) polymers, wherein the polymers include PVC or PVC-VA copolymer or a mixture thereof, and the polymers are in an amount of 60-85 parts by weight based on the total weight of 100 parts by weight of the dye receiving layer; (b) a plasticizer, wherein the plasticizer has a melting point higher than 40° C., and the plasticizer is in an amount of 10-35 parts by weight based on the total weight of 100 parts by weight of the dye receiving layer; and (c) heat stabilizer, wherein the stabilizer is in an amount of 2-8 parts by weight based on the total weight of 100 parts by weight of the dye receiving layer.

10 Claims, 3 Drawing Sheets

(51) Int. Cl.
- *B32B 7/12* (2006.01)
- *B32B 27/10* (2006.01)
- *B32B 37/12* (2006.01)
- *B32B 37/20* (2006.01)
- *C09J 5/00* (2006.01)
- *B41M 5/42* (2006.01)
- *C08L 27/06* (2006.01)
- *C08L 31/04* (2006.01)

(52) U.S. Cl.
CPC ....... *B41M 5/5254* (2013.01); *B41M 2205/02* (2013.01); *B41M 2205/32* (2013.01); *B41M 2205/34* (2013.01); *C08L 27/06* (2013.01); *C08L 31/04* (2013.01)

(56) References Cited

U.S. PATENT DOCUMENTS

| | | | |
|---|---|---|---|
| 8,377,846 B2 * | 2/2013 | Dontula et al. | B41M 5/44 503/227 |
| 2008/0081766 A1 | 4/2008 | Sakai et al. | |

FOREIGN PATENT DOCUMENTS

| | | |
|---|---|---|
| JP | H10338750 A | 12/1998 |
| JP | 2010-6067 A | 1/2010 |
| WO | 9002049 A1 | 3/1990 |

* cited by examiner

DYE RECEIVING LAYER COMPOSITION, DYE RECEIVING SUBSTRATE AND METHOD OF FABRICATING THE SAME

CROSS REFERENCE TO RELATED APPLICATIONS

This application claims priority to Taiwan Application Serial Number 106105129, filed Feb. 16, 2017, which is herein incorporated by reference.

BACKGROUND

Field of Invention

The present invention relates to a dye receiving layer and a method of fabricating the same. More particularly, the present invention relates to a PVC dye receiving layer formed by a lamination process.

Description of Related Art

In recent years, the methods of recording images have been developed. The methods include the uses of ink jet recording, thermal dye transfer, digital photography, silver halide photosensitive material, printing ink and recording pen. Thermal dye transfer has been generally used for high quality and full-color recording. During thermal dye transfer, a dye-donor element including dye layers of yellow, magenta and cyan dyes is heated up, and the dyes vaporize by heating the thermal transfer dyes. The dye layers imprint on the dye receiving element face to face, and the dyes transfer to the dye receiving element (or the dye receiving sheet) by thermal diffusion.

A common dye receiving element (or dye receiving sheet) includes a substrate and at least one dye receiving layer on one side of the substrate. The dye receiving layer includes polymers which can receive dyes by heating the dye receiving layer. During the transfer, the dye at high temperature must move rapidly between the molecules of the dye receiving layer, and the dye remains stable and still in the non-transfer state. Therefore, the selection of the dye receiving layer determines the qualities of images such as ease of printing, light resistance, heat resistance, dye transferability to various chemicals, ease of synthesis, and optical density.

Reference is made to FIG. 1. FIG. 1 illustrates a schematic view of a conventional thermal transfer system. The conventional thermal transfer system includes a heating element 12 and a roller 14 disposed on the opposite side of the heating element 12. During the dye transfer, a ribbon 30 and a photographic paper 20 move along the direction indicated by the arrows. The ribbon 30 (dye-donor element) directly contacts the heating element 12 to prevent the thermal loss of the dyes. The photographic paper 20 is disposed between the ribbon 30 and the roller 14. The photographic paper 20 includes a substrate 22 and a dye receiving layer 24. When the heating element 12 heats the ribbon 30, the dye 26 of the ribbon 30 is heated up and moves rapidly onto the dye receiving layer 24 of the photographic paper 20. The dye 26 is absorbed by the polymers of the dye receiving layer 24.

However, the dyes of conventional thermal dye transfer are limited by the compatibility between the dyes and the dye receiving layer and the various aspects of the process. Only a few polymers meet all the requirement of the method. The common materials used for the dye receiving layer include polyvinyl chloride (PVC) and polycarbonate (PC). Polyvinyl chloride and polycarbonate are generally formed on a substrate by coating. However, the coating requires the use of solvents, and it results in issues such as recycling the solvents and risks of the environmental pollution. The steps of coating process are complicated and thereby increase the manufacturing cost. If the polymers of the dye receiving layer are formed on the substrate by a lamination process, an extra drying process taking a long time is needed because polycarbonate is easy to hydrolyze. The processing temperature of the lamination process is as high as 300° C., and the optical density of polycarbonate is worse than that of PVC. Although PVC has a good optical density as a dye receiving layer, the formation of the dye receiving layer made of PVC on the substrate will easily lead to the non-uniform thickness, the worse surface of the dye receiving layer and many crystal points. This further causes the unevendistribution of the dyes in the dye receiving layer during printing, and finally white dots are formed on the images.

SUMMARY

According to various embodiments of the present application, a dye receiving sheet is provided. The dye receiving sheet has a substrate and at least a dye receiving layer disposed on one side of the substrate. The dye receiving layer includes polymers, a plasticizer, and a heat stabilizer. The polymers includes PVC or PVC-VA copolymer or a mixture thereof, and the polymers are in an amount of 60-85 parts by weight based on the total weight of 100 parts by weight of the dye receiving layer. The plasticizer has a melting point higher than 40° C., and the plasticizer is in an amount of 10-35 parts by weight based on the total weight of 100 parts by weight of the dye receiving layer The heat stabilizer is in an amount of 2-8 parts by weight based on the total weight of 100 parts by weight of the dye receiving layer.

According to various embodiments of the present application, the invention provides a method of fabricating a dye receiving sheet. A substrate is provided. A dye receiving layer is then formed on at least one side of the substrate by a lamination process.

The dye receiving material of the present application does not need additional solvents in the coating process. The quality of the images can be substantially increased because of the advantages of the dye receiving material, such as low processing temperatures, good fluidity, high optical densities and low occurrence of the crystal points.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
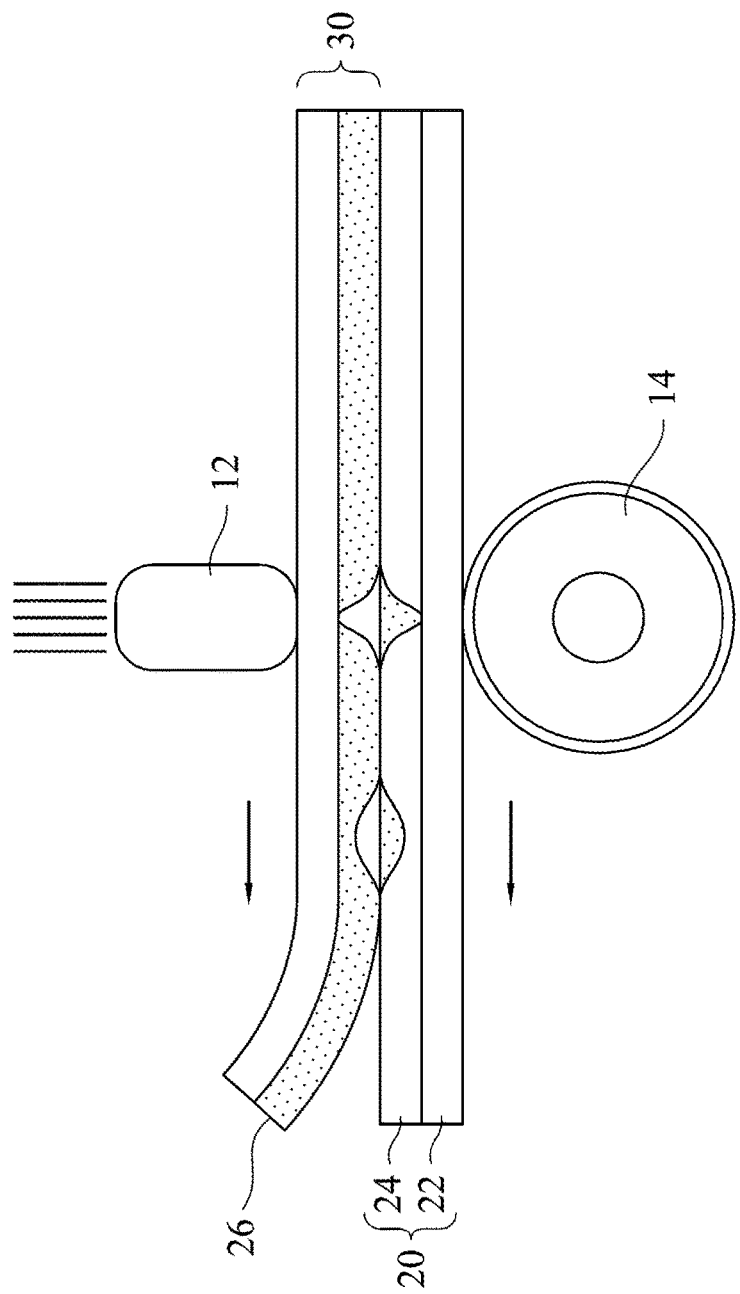
FIG. 1 is a schematic view of the method of fabricating the conventional dye receiving layer.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A dye receiving material used for the dye receiving layer is provided in accordance with some embodiments of the present application. The dye receiving material includes a combination of polymers including polyvinyl chloride (PVC), polyvinyl chloride-vinyl acetate (PVC-VA) copolymer, a plasticizer and a heat stabilizer. The composition of the dye receiving material, the dye receiving sheet formed by the dye receiving layer and the preparation steps of the dye receiving sheet are described in detail hereinafter.

The dye receiving material includes polymers. The polymers include PVC, PVC-VA copolymer, or a mixture thereof, and the polymers are in an amount of 60-85 parts by weight based on the total weight of 100 parts by weight of the dye receiving layer. The polymers are preferably in an amount of 65-75 parts by weight based on the total weight of 100 parts by weight of the dye receiving layer. In PVC-VA copolymer, vinyl acetate (VA) is in an amount of 10-20 parts by weight based on the total weight of 100 parts by weight of the PVC-VA copolymer. The average molecular weight of the polymers of the dye receiving layer is between 24 kDa and 82 kDa. The degree of polymerization (DP) of the polymers of the dye receiving layer is between 400 and 1300.

The dye receiving material further includes a plasticizer. The plasticizer is in an amount of 10-35 parts by weight based on the total weight of 100 parts by weight of the dye receiving layer. The addition of the plasticizer to the dye receiving layer will improve the softness of the polymers, thereby increasing the flowability of the heated dye receiving material and improving uniformity of the thickness of the dye receiving layer. If the content of the plasticizer is less than 10 parts by weight, the stiffness of the material of dye receiving layer will be too large, and it causes the uneven distribution of the polymers and further results in the non-uniform thickness of the dye receiving layer and crystal points. If the plasticizer is in an amount of more than 35 parts by weight, the dye receiving layer may stick to the ribbon (dye-donor element) during the thermal transfer. It causes blurred images after printing. Based on the total weight of 100 parts by weight of the dye receiving layer, the plasticizer is preferably in an amount of 20-30 parts by weight, more preferably 20-28 parts by weight.

The flowability of the dye receiving layer is related to the laminating thickness of the dye receiving layer formed on the substrate and the distribution of the particles of the dye receiving layer. The flowability of PVC is about zero so that the dye receiving layer cannot be formed by a lamination process. The low flowability (e.g. the Comparative Example 1) may result in the uneven distribution of the polymers, the non-uniform thickness of the dye receiving layer and the crystal points. Therefore, the addition of the plasticizer may effectively increase the flowability of the dye receiving layer, and it allows the dye receiving layer to smoothly be formed on the substrate to achieve the uniform thickness of the dye receiving layer. The thickness of the dye receiving layer may be further controlled by the high flowability.

In accordance with some embodiments of the present application, the plasticizer added to the material of the dye receiving layer is selected from the group consisting of phthalate, alkyl citrates, hydrogenated benzene, carboxylate, benzoate, sulfonamide, sulphosuccinic acid ester, diol/polyether polyol, stearate, and a combination thereof. According to some embodiments of the present application, the plasticizer has a melting point higher than 40° C. The plasticizer includes (but not limited to) pentaerythrityl tetrastearate (PETS) of formula (1), 2-hydroxyethyl stearate of formula (2) and a combination thereof. The melting Formula (1)

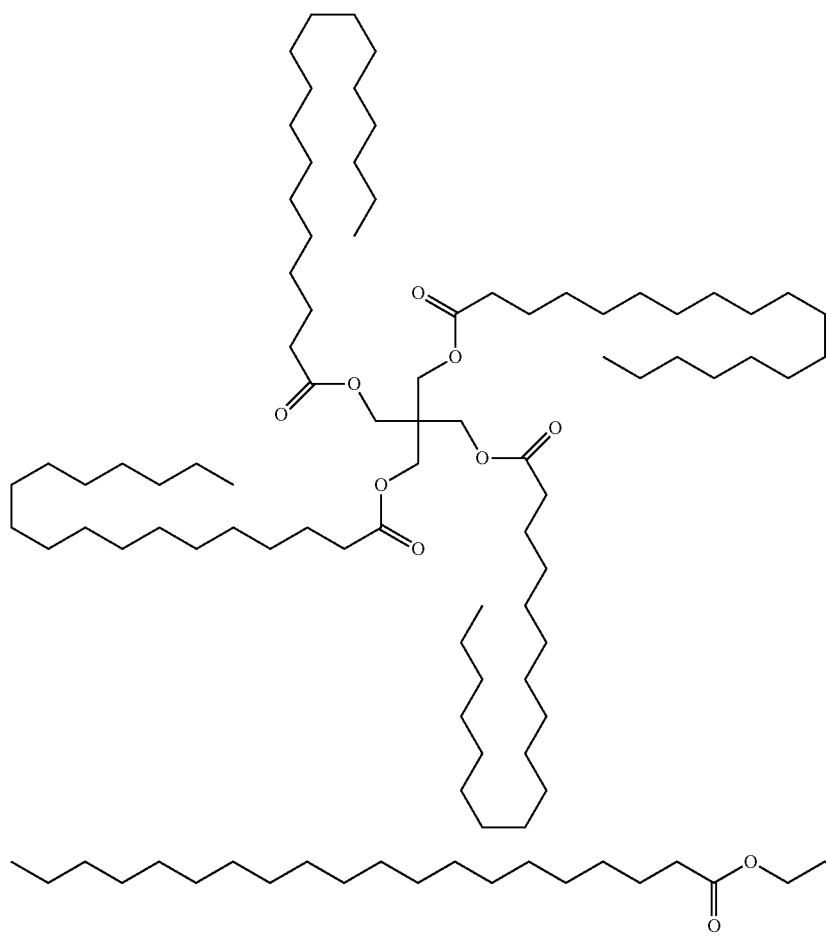

Formula (2)

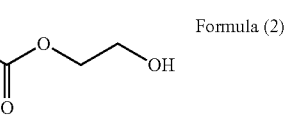

The plasticizer having a melting point higher than 40° C. allows the main ingredients of the dye receiving layer to be mixed in solid-state. In detail, the oil absorption of PVC, PVC-VA copolymer or a mixture thereof is poor. If a liquid-state plasticizer is mixed with powdered PVC, powdered PVC-VA copolymer or a mixture thereof, the ingredients of the mixture may be poorly distributed. Plasticizer having a high melting point is solid at room temperature. The plasticizer having a high melting point can be powdered and evenly mixed with powdered PVC, powdered PVC-VA copolymer or a mixture thereof. In a granulation process, the powdered plasticizer is evenly mixed with the powders of PVC, PVC-VA copolymer, or a mixture thereof to prevent the crystal points formed on the dye receiving layer in the subsequent steps, such as a screw rolling process and an extrusion process.

formed on the dye receiving layer in the subsequent steps, such as a screw rolling process and an extrusion process.

In some embodiments, the plasticizer added to the dye receiving layer includes phthalates having at least a benzene ring and a melting point higher than 40° C. The plasticizer is selected from the group consisting of (but not limited to) dicyclohexyl phthalate (DCHP) of formula (3), diphenyl phthalate (DPP) of formula (4), and a combination thereof. The melting point of dicyclohexyl phthalate is between 63 and 67° C. The melting point of diphenyl phthalate is between 72 and 76° C.

Formula (3)

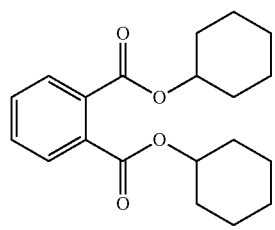

Formula (4)

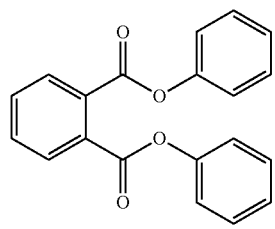

In some embodiments, the plasticizer added to the dye receiving layer includes sulfonamide having at least a benzene ring and a melting point higher than 40° C. The plasticizer has the following formula (5):

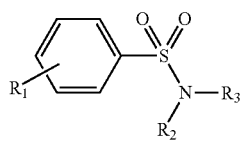
Formula (5)

$R_1$ is H, or a straight or branched $C_1$-$C_6$ alkyl chain. $R_2$ and $R_3$ are the same or different. R2 and R3 are independently selected from the group consisting of H, a straight or branched $C_1$-$C_6$ alkyl chain, a $C_5$-$C_8$ cycloalkanes group, a straight or branched $C_1$-$C_6$ haloalkyl chain, a straight or branched $C_1$-$C_6$ hydroxyalkyl chain, a straight or branched $C_1$-$C_6$ alkyl chain with at least a substituent of $C_6$-$C_{14}$ aryl group. Sulfonamide having at least a benzene ring includes (but not limited to) p-toluenesulfonamide (PTSA) of formula (6), p-ethylbenzenesulfonamide (p-EBSA) of formula (7), p-propylbenzenesulfonamide (p-PBSA) of formula (8), p-isopropylbenzenesulfonamide of formula (9), p-n-butyl-benzenesulfonamide (p-n-BBSA) of formula (10), p-tert-butylbenzenesulfonamide of formula (11), N-methyl-p-toluenesulfonamide (MTSA) of formula (12), N-ethyl-p-toluenesulfonamide (N-E-PTSA) of formula (13), N-butyl-p-toluenesulfonamide of formula (14), N-cyclohexyl-p-toluenesulfonamide of formula (15), and a combination thereof. The melting point of p-toluenesulfonamide is between about 134° C. and 139° C. The melting point of p-ethylbenzenesulfonamide is about 111° C. The melting point of p-propylbenzenesulfonamide is between about 98° C. and 110° C. The melting point of p-isopropylbenzenesulfonamide is between about 103° C. and 106° C. The melting point of p-n-butylbenzenesulfonamide is between about 93° C. and 95° C. The melting point of p-tert-butylbenzenesulfonamide is between about 135° C. and 142° C. The melting point of N-methyl-p-toluenesulfonamide is between about 76° C. and 80° C. The melting point of N-ethyl-p-toluenesulfonamide is between about 63° C. and 71° C. The melting point of N-butyl-p-toluenesulfonamide is about 41° C. The melting point of N-cyclohexyl-p-toluenesulfonamide is between about 85° C. and 89° C.

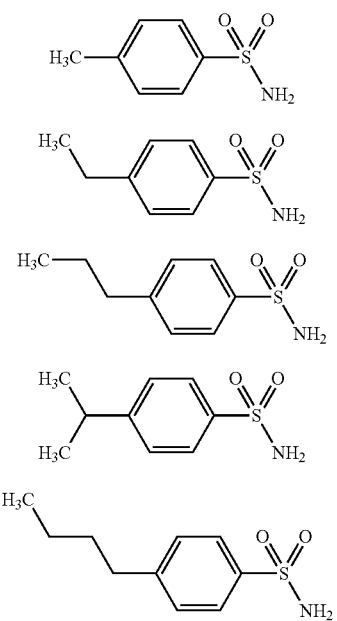

Formula (6)

Formula (7)

Formula (8)

Formula (9)

Formula (10)

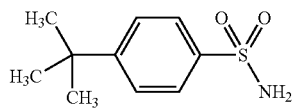
Formula (11)

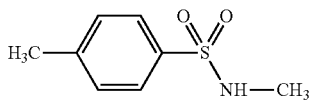
Formula (12)

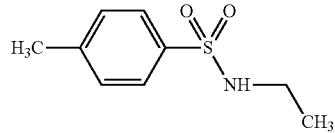
Formula (13)

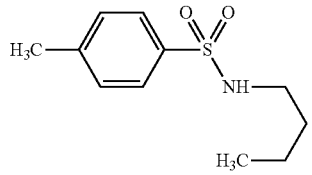
Formula (14)

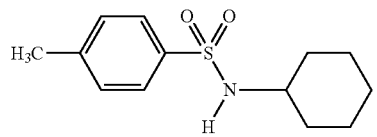
Formula (15)

In some embodiments, the plasticizer added to the dye receiving layer includes benzoate having a melting point higher than 40° C. The plasticizer is selected from the group consisting of (but not limited to) 2,2-dimethyl-1,3-propanediol dibenzoate (NPG dibenzoate) of formula (16), 1,4-cyclohexane dimethanol dibenzoate of formula (17), glyceryl tribenzoate of formula (18), sucrose benzoate of formula (19), and a combination thereof. The melting point of 2,2-Dimethyl-1,3-propanediol dibenzoate is between about 45° C. and 55° C. The melting point of 1,4-cyclohexane dimethanol dibenzoate is between about 117° C. and 118° C. The melting point of glyceryl tribenzoate is between about 68° C. and 73° C. The melting point of sucrose benzoate is between about 93° C. and 100° C.

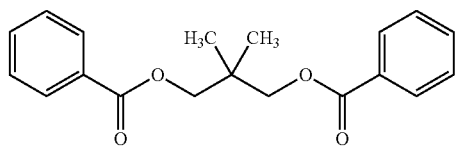
Formula (16)

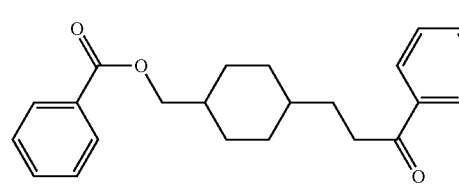
Formula (17)

-continued

Formula (18)

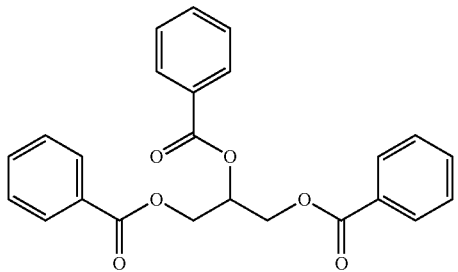

Formula (19)

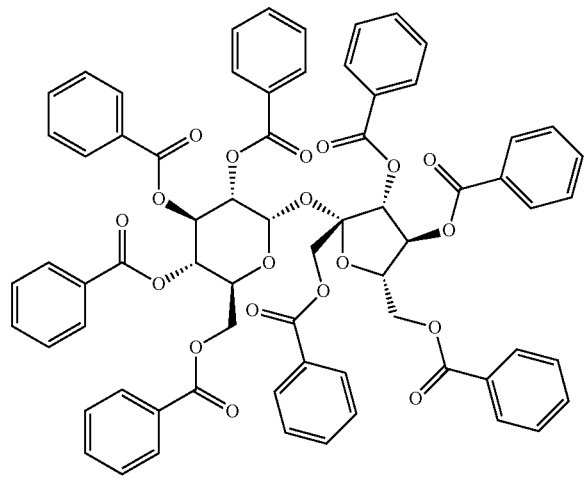

In some embodiments, the plasticizer added to the dye receiving layer includes phosphate ester having a melting point higher than 40° C. The plasticizer is selected from the group consisting of (but not limited to) triphenyl phosphate (TPP) of formula (20). The melting point of triphenyl phosphate is between about 48° C. and 50° C.

Formula (20)

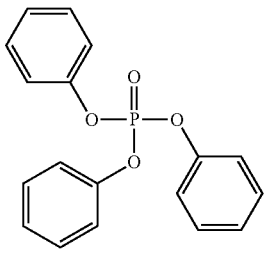

The plasticizer having at least a benzene ring and a melting point higher than 40° C. can increase the flowability of the dye receiving layer during the formation of the dye receiving layer. The benzene ring of the plasticizer can increase the polarity of the polymers of the dye receiving layer in comparison with the long carbon chain of pentaerythrityl tetrastearate, acetylated monoglyceride and 2-hydroxyethyl stearate. The increase in the polarity of the polymers of the dye receiving layer allows the dyes to be absorbed easily and results in the high optical density. The ratio of the plasticizer, PVC and PVC-VA copolymer, or a mixture thereof of the dye receiving layer can be adjusted according to the required product requirement. For example, the ratio between the plasticizer and PVC-VA copolymer can be increased to increase the flowability of the dye receiving material. Furthermore, the addition of PVC can increase the stiffness. In some embodiments, PVC and PVC-VA copolymer can be mixed or independently exist in the dye receiving material. For example, the dye receiving layer may only include PVC-VA copolymer without PVC.

The dye receiving material further includes a heat stabilizer in an amount of 2-8 parts by weight based on the total weight of 100 parts by weight of the dye receiving layer to prevent the degradation of the polymers. The heat stabilizer is selected form the group consisting of (but not limited to) a stabilizer containing lead, a stabilizer containing metallic soap, a stabilizer containing organic tin, a stabilizer containing organic antimony, and a stabilizer containing alloys such as barium/cadmium, barium/cadmium/zinc, barium/zinc, calcium/zinc, calcium/zinc/tin, or calcium/magnesium/tin/zinc. Examples of the heat stabilizer include tribasic lead sulfate, dibasic lead phosphite, dibasic lead stearate, dibasic lead phthalate, alkylphenol barium, 2-ethyl-hexanoic acid barium, barium laurate, barium benzoate, barium neo-decanoate, barium stearate, 2-ethylhexanoic acid zinc, zinc laurate, zinc naphthenate, zinc neo-decanoate, zinc dibenzoate, zinc acetylacetonate, zinc octadecanoate, methyl tin, dicotyltin dilaurate, dibutyltin dilaurate, dibutyltin maleane, methyltin mercatide, butyltin mercatide, octyltin mercatide. The dye receiving material can include an additive known in the art. For example, the additive includes (but not limited to) a lubricant, a processing aid agent, a fire retardant, and an antioxidant. The lubricant may be, for example, polyethylene wax or stearate. Stearate used as a lubricant may be, for example, pentaerythrityl tetrastearate. The processing aid agent can improve the mixing and formation of the dye receiving layer. The processing aid agent may be, for example, acrylic resin or 2-methylpropenoic acid resin, which is a polymer formed by emulsion polymerization of at least one acrylic ester monomer. Examples of the acrylic ester monomer include, but not limited to, prop-2-enoic acid, 2-methylpropenoic acid, methyl acrylate, methyl methacrylate, butylacrylat, n-butyl methacrylate, 2-methylpropylacrylate, isobutyl methacrylate, 2-hydroxyethyl acrylate, acrylic acid isobornyl ester (IBOA), isobornyl methacrylate, 2-hydroxyethyl acrylate, 2-hydroxyethyl methacrylate, 2-hydroxypropyl methacrylate, glycidyl methacrylate (GMA), cyclohexyl methacrylate (CHMA), hydroxypropyl acrylate (HPA), 2-hydroxypropyl methacrylate (HPMA) and a combination thereof.

Figure 2:
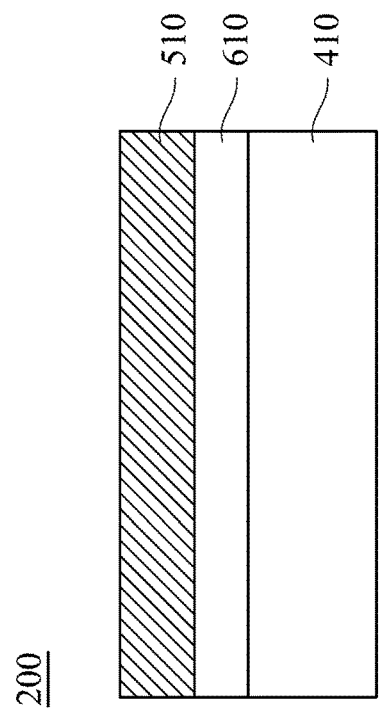
FIG. 2 is a schematic cross-sectional view of the dye receiving layer in accordance with some embodiments of the present application.
Figure 2:
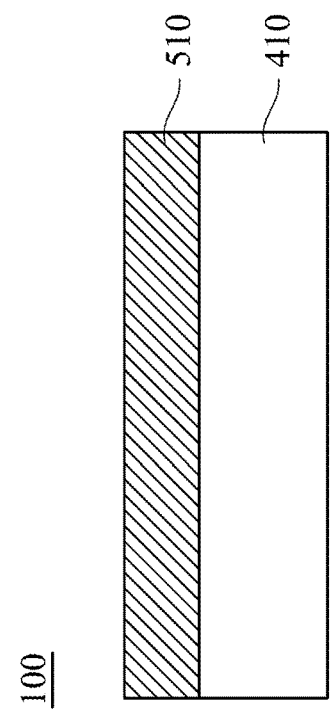

Please refer to FIG. 2, the dye receiving sheets 100 and 200 can be formed by using the dye receiving layer. The dye receiving sheet 100 includes a substrate 110 and a dye receiving layer 120. The methods of forming the dye receiving sheets 100 and 200 are described in detail hereinafter.

Figure 3:
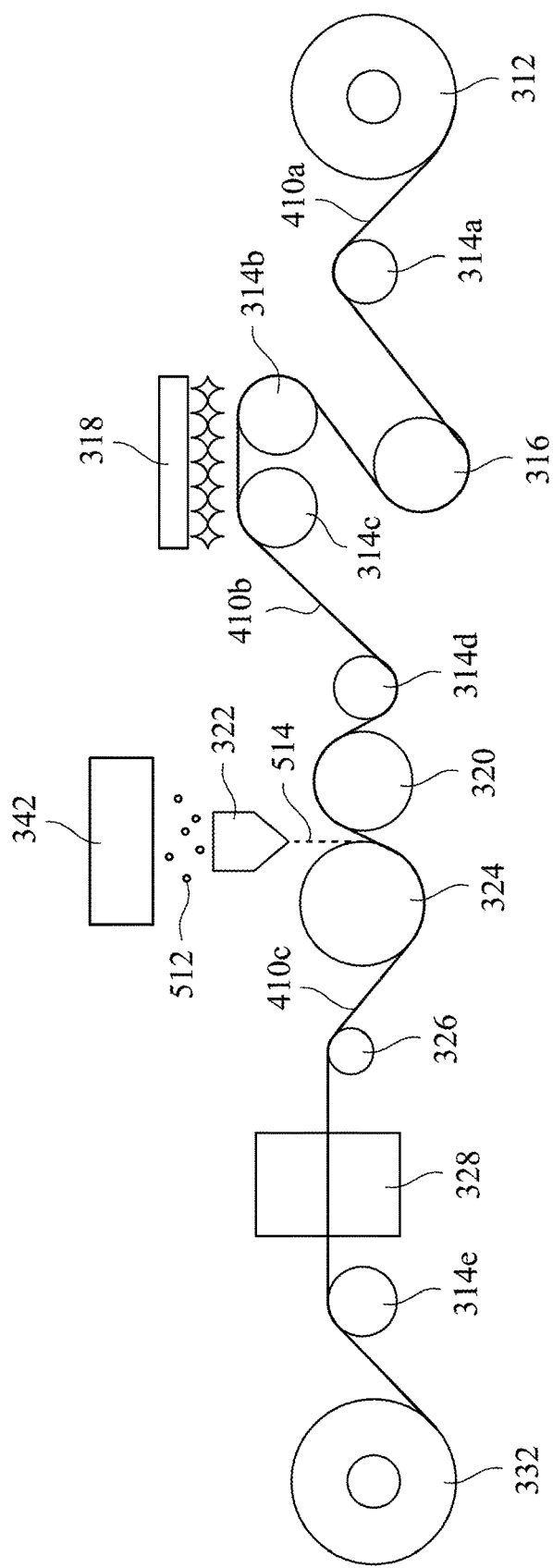
FIG. 3 is a schematic diagram of the method of fabricating the dye receiving layer in accordance with some embodiments of the present application.

Please refer to FIG. 3, which is a schematic view of forming the dye receiving sheet. First, a treatment may be applied to the surface of the dye receiving sheet. The substrate may be paper, a plastic film, woven cloth and non-woven cloth. The substrate 410a enters the reel 312 to be unfolded. After passing through the reel 314a, the unfolded substrate 410a is preheated by a preheating roller 316. After being preheated, the substrate 410a passes through the reel 314b and 314c. The surface of the substrate 410a is modified by a corona treatment 318. The corona treatment on the surface facilitates the laminating material to adhere to the surface of the substrate in the subsequent lamination process. The corona treatment 318 modifies the surface structure of the substrate 410a by high voltage and high frequency to allow the melting laminating material to easily adhere to the substrate. The substrate 410a may be (but not limited to) paper, a plastic film, woven cloth and non-woven cloth. The surface-treated substrate 410b continues to move through the reel 314d, the rubber reel 320 and arrives at the lips of the T-die 322.

The T-die 322 may connect to the extruder 342. The dye receiving material includes polymers in an amount of 60-85 parts by weight, a plasticizer having a melting point higher than 40° C. and in an amount of 10-35 parts by weight, and a heat stabilizer in an amount of 2-8 parts by weight. The polymers include PVC, PVC-VA copolymer or a mixture thereof. Additives such as lubricants, processing aid agent, fire retardants and antioxidants may be added to the dye receiving material. The solid and dry powders of the dye receiving material are mixed evenly and sent into the extruder 342. The extruder 342 may be a single-screw extruder or a twin-screw extruder. The powders of the dye receiving material are transformed into beads 512 by the extruder 342. By adjusting the pressure and the rolling speed of the screw, the sizes of the beads 512 may be tuned. The beads 512 are then sent into the T-die 322 to be extruded after being melted and plasticized. The dye receiving material is heated up to 170-195° C. during the extrusion. The dye receiving layer 514 is extruded in a streamline and in molten state. After the extrusion, the dye receiving layer 514 stretches and adheres to the corona-treated surface of the substrate 410b.

The heating temperature of the T-die 322 varies according to the ratio of each of the components of the dye receiving material. For example, the higher the ratio of PVC-VA copolymer is, especially the ratio of VA in the PVC-VA copolymer (e.g. VA in an amount of 15 parts by weight based on the PVA-VA copolymer of 100 parts by weight), the lower the heating temperature is. The heated dye receiving layer 514 can be melted to become a molten state. The flowing speed of the molten dye receiving layer 514 can be tuned by adjusting the rotating speed of the screw-extrusion. The thickness of the molten dye receiving layer 514 can be tuned by adjusting the lips of the T-die 322.

The molten dye receiving material 512 moves through the lips and is dispersed onto the corona-treated surface of the substrate 410b. The crystal points hardly form on the dye receiving layer in molten state after being heated and extruded by the extruder 342 and the T-die 322 because the components of the dye receiving layer are evenly mixed in solid state as powders. Further, PVC, PVC-VA copolymer or a mixture thereof and the plasticizer have higher flowability, and thus the molten dye receiving layer 514 is evenly dispersed on the substrate 410b in the heated condition. The substrate 410c covered by the dye receiving material moves to the cooling wheel 324 to be rolled and fitted for the dye receiving material. The substrate 410c continues to pass through the cutting wheel 326, the film thickness detection system 328 and finally the rolling reel 332 to complete the dye receiving sheet 100 as shown in FIG. 2. The dye receiving sheet in FIG. 2 includes the substrate 410 and -evenly distributed and flattened dye receiving layer 510 which smoothly laminates on the substrate 410.

In addition to controlling the rotating speeds of the screw-extrusion and the lips to tune the laminating speed of the molten dye receiving layer 514 and thereby control the thickness of the dye receiving layer 510, the thickness of the dye receiving layer 510 can be tuned by adjusting the speed of the reels 314a-314e. In detail, when the laminating speed of the molten dye receiving layer 514 remains the same and the rotating speed of the reels 314a-314e becomes faster, the thickness of the dye receiving layer 510 on the surface of the substrate 410 becomes thinner. When the rotating speed of the reels 314a-314e become slower, the amount per unit of time of the molten dye receiving layer 514 formed on the surface of the substrate 410b increases and it results in thicker dye receiving layer 510 because the lips of the T-die 322 rest on the same portion of the surface of the substrate 410b for a longer period. The dye receiving layer 510 is formed on the surface of the substrate 410 by laminating the molten dye receiving layer 514. The thickness of the dye receiving layer 510 can be tuned by adjusting different parameters of the lamination process. The thickness of the substrate 410 is usually between about 140 µm and 220 µm. The thickness of the dye receiving layer 510 formed by the lamination process is between about 7 µm and 50 µm, and is preferably between about 10 µm and 30 µm.

Furthermore, please refer back to FIG. 2. The dye receiving sheet 200 may include an adhesive layer 610 disposed between the dye receiving layer 510 and the substrate 410. The adhesive layer 610 may be formed on the surface of the substrate by coating, which may include scraper coating, bar coating, slot die coating, gravure coating, slide coating, curtain coating or spray coating, and it preferably includes slot die coating and gravure coating. The adhesive layer 610 may be formed on the substrate 410b by co-extruding with the molten dye receiving layer 514. The adhesive layer 610 can further improve the adhesion strength between the dye receiving layer 510 and the substrate 410. The material of the adhesive layer 610 may include (but not limited to) ethylene-vinyl acetate copolymer (EVA) resin, polyvinyl butyral (PVB) resin, vinyl chloride ethylacetate resin, prop-2-enoic acid/methacrylate resin, acrylic ester resin, polyvinylether resin, epoxy, melamine resin, silicone resin, polyurethane (PU) resin, thermoplastic polyurethane (TPU), chlorinated polypropylene, vinyl acetate, polyvinyl alcohol, phenylethene/butadiene/phenylethene block-copolymer resin, or a combination thereof. In some embodiments, the dye receiving layer may be disposed on the two opposite sides of the substrate so that the dye receiving sheet is a double-sided structure.

Examples of Preparing the Dye Receiving Material

The dye receiving material is prepared according the components and ratios listed in Table 1. The dye receiving material is sent into the extruder to form the beads for the dye receiving layer. The temperature of the extruder is between about 110° C. and 150° C.

TABLE 1

| | Polymers | | Plasticizer | | Heat Stabilizer | | Lubricant | | Processing Aid Agent | |
|---|---|---|---|---|---|---|---|---|---|---|
| | species | amount | species | amount | species | amount | species | amount | species | amount |
| Example 1 | PVC-VA-1 | 81% | DCHP | 10% | Organic Tin | 5% | P E Wax | 2% | ACR | 2% |

TABLE 1-continued

| | Polymers | | Plasticizer | | Heat Stabilizer | | Lubricant | | Processing Aid Agent | |
|---|---|---|---|---|---|---|---|---|---|---|
| | species | amount | species | amount | species | amount | species | amount | species | amount |
| Example 2 | PVC-1 | 76% | PETS | 15% | Organic Tin | 5% | P E Wax | 2% | ACR | 2% |
| Example 3 | PVC-1 | 71% | DCHP | 20% | Organic Tin | 5% | P E Wax | 2% | ACR | 2% |
| Example 4 | PVC-VA-2 | 66% | DCHP | 25% | Organic Tin | 5% | P E Wax | 2% | ACR | 2% |
| Example 5 | PVC-1 | 66% | N-E-PTSA | 25% | Organic Tin | 5% | P E Wax | 2% | ACR | 2% |
| Example 6 | PVC-2 | 66% | Glyceryl tribenzoate | 25% | Organic Tin | 5% | P E Wax | 2% | ACR | 2% |
| Example 7 | PVC-VA-3 | 66% | NPG dibenzoate | 25% | Organic Tin | 5% | P E Wax | 2% | ACR | 2% |
| Example 8 | PVC-3 | 66% | PTSA | 25% | Organic Tin | 5% | P E Wax | 2% | ACR | 2% |
| Example 9 | PVC-4 | 61% | DCHP | 30% | Organic Tin | 5% | P E Wax | 2% | ACR | 2% |
| Example 10 | PVC-4 | 83% | DCHP | 8% | Organic Tin | 5% | P E Wax | 2% | ACR | 2% |
| Example 11 | PVC-5 | 71% | DINCH | 20% | Organic Tin | 5% | P E Wax | 2% | ACR | 2% |
| Example 12 | PVC-VA-4 | 66% | DINP | 25% | Organic Tin | 5% | P E Wax | 2% | ACR | 2% |
| Example 13 | PVC-5 | 56% | DCHP | 35% | Organic Tin | 5% | P E Wax | 2% | ACR | 2% |

PVC-1: PVC (B-60, Formosa Plastics Corp.),
PVC-2: PVC (S-65, Formosa Plastics Corp.),
PVC-3: PVC (H-61, China General Plastics Corp.),
PVC-4: PVC (H-66, China General Plastics Corp.),
PVC-5: PVC (S-108 (SG7), Ocean Plastics Co.),
PVC-VA-1: PVC-VA coplolymer (the amount of VA is 8%) (C-8, Formosa Plastics Corp.),
PVC-VA-2: PVC-VA coplolymer (the amount of VA is 13%) (SOLBIN C, Nissin-Chem.Co.),
PVC-VA-3: PVC-VA coplolymer (the amount of VA is 12-14%) (VYHH, UCAR),
PVC-VA-4: PVC-VA coplolymer (the amount of VA is 12.5%) (C-15, Formosa Plastics Corp.),
DCHP: dicyclohexyl phthalate (Sk-102, Yueyang Scichemy Co.),
PETS: pentaerythrityl tetrastearate (PETS, Lonza),
N-E-PTSA: N-ethyl-p-toluenesulfonamide (N-Ethyl-p-toluenesulfonamide, Jiaxing Xiangyang Chemicals Factory),
Glyceryl tribenzoate: glyceryl tribenzoate (SK-1302, Yueyang Scichemy Co.),
NPG dibenzoate: 2,2-dimethylpropane-1,3-diyl dibenzoate (N0573, TCI),
PTSA: p-Toluenesulfonamide (p-Toluenesulfonamide, Jiaxing Xiangyang Chemicals Factor),
DINCH: di-isononyl-cyclohexane (Hexamoll® DINCH®, BASF),
DINP: di-iso-nonyl phthalate (DINP, Nan Ya),
Organic Tin: methyl-tin (TM-381, Pautai Co.),
PE Wax: Hi-wax (4202E, Mitsui Chemicals Inc.),
ACR: methyl/butylacrylic acid resin (KM-3551, Pautai Co.).

Embodiment 1

The beads of the dye receiving layer of Example 1 are sent into the extruder to be melted and plasticized by the screws, and the molten and plasticized beads are then extruded by the T-die to allow the molten dye receiving material to be extruded in a streamline and adhere to the paper (coated ivory board, Chung Hwa Pulp Corp.) having the adhesive layer, and then the dye receiving material and the paper are rolled by the cooling wheel to form the dye receiving sheet. The parameters of the extruder are listed in the following. The temperature of the screw is between about 155° C. and 185° C. The temperature of the T-die is about 195° C. The temperature of the cooling wheel is about 40° C. The rotating speed of the flow controlling valve is about 75 rpm. The rolling speed of the substrate is about 75 M/min. The average thickness of the dye receiving layer is about 16 μm.

Embodiment 2-9

Embodiment 2-9 use the beads of the dye receiving layer of Examples 2-9 respectively, and the fabricating methods of Embodiment 2-9 are the same as Embodiment 1.

Comparative Embodiments 1-4

Comparative embodiments 1-4 use the beads of the dye receiving layer of Examples 10-13 respectively, and the fabricating methods of Comparative embodiments 1-4 are the same as Embodiment 1.

Comparative Embodiment 5

A dye receiving material for coating is prepared. The dye receiving material includes PVC (C-15, Formosa Plastics Corp.) in an amount of about 13.6 parts by weight, the plasticizer (4202E, Mitsui Chemicals Inc.) in an amount of about 4.6 parts by weight, the lubricant (KM-3551, Pautai Co.) in an amount of about 0.4 parts by weight, the heat stabilizer (TM-381, Pautai Co.) in an amount of about 1.0 parts by weight, 2-butanone in an amount of about 40 parts by weight, methylbenzene in an amount of about 40 parts by weight. The dye receiving material is coated onto a paper (coated ivory board, Chung Hwa Pulp Corp.) having an adhesive layer and then dried at the temperature ranging from about 100° C. to 110° C. The average thickness of the dye receiving layer is about 16 μm.

Blank experiment: a dye receiving material for coating is prepared. The dye receiving material includes PVC (C-15, Formosa Plastics Corp.) in an amount of about 15 parts by weight, the processing aid agent (KM-3551, Pautai Co.) in an amount of about 0.4 parts by weight, the heat stabilizer (TM-381, Pautai Co.) in an amount of 1.0 parts by weight, 2-butanone in an amount of 40 parts by weight, methylbenzene in an amount of 40 parts by weight. The dye receiving material is coated onto a paper (coated ivory board, Chung Hwa Pulp Corp.) having an adhesive layer and then dried at the temperature ranging from about 100° C. to 110° C. The average thickness of the dye receiving layer is about 16 μm.

Table 2 is the result of the evaluation of flowability, crystal points, blur and optical density of each of the samples.

TABLE 2

| | Flowability | Crystal Points | Blur | Optical Density Y | M | C | K |
|---|---|---|---|---|---|---|---|
| Embodiment 1 | Δ | Δ | O | 2.03 | 1.92 | 1.97 | 2.02 |
| Embodiment 2 | Δ | Δ | O | 1.86 | 1.62 | 1.74 | 1.79 |
| Embodiment 3 | O | O | O | 2.09 | 2.00 | 2.04 | 2.06 |
| Embodiment 4 | O | O | Δ | 2.19 | 2.10 | 2.04 | 2.10 |
| Embodiment 5 | O | Δ | Δ | 2.19 | 2.08 | 2.02 | 2.07 |
| Embodiment 6 | O | O | Δ | 2.25 | 2.13 | 2.09 | 2.12 |
| Embodiment 7 | O | O | Δ | 2.21 | 2.20 | 2.10 | 2.14 |
| Embodiment 8 | O | Δ | Δ | 2.17 | 2.07 | 2.00 | 2.03 |
| Embodiment 9 | O | O | Δ | 2.43 | 2.32 | 2.12 | 2.24 |
| Blank Experiment | — | O | O | 2.10 | 2.07 | 2.03 | 2.08 |
| Comparative Embodiment 1 | X | X | O | 2.01 | 1.92 | 1.98 | 2.01 |
| Comparative Embodiment 2 | O | X | Δ | 1.91 | 1.65 | 1.72 | 1.83 |
| Comparative Embodiment 3 | O | XX | X | 2.19 | 2.10 | 2.03 | 2.13 |
| Comparative Embodiment 4 | O | O | X | 2.48 | 2.40 | 2.12 | 2.28 |
| Comparative Embodiment 5 | — | O | Δ | 2.10 | 2.06 | 2.04 | 2.07 |

Flowability Evaluation

The flowability of each of the samples is evaluated by observing that whether the two sides of the edges of the T-die are filled with PVC and whether the thickness of the film formed by the lamination is uniform. "O": the two sides of the edges of the T-die are filled with PVC, and the deviation of the thickness is less than 5 μm. "Δ": the two sides of the edges of the T-die are filled with PVC, and the deviation of the thickness is more than 5 μm. "X": the two sides of the edges of the T-die are not filled with PVC.

Evaluation of the Crystal Points

The samples listed above are cut into sizes and each of the size is 30 cm wide and 20 cm long. The crystal points on the dye receiving layer are observed with naked eyes. "O"; the dye receiving layer has no obvious crystal point (no crystal point with a diameter between about 0.2 cm and 0.5 cm, and the number of crystal points with diameters between about 0.02 cm and 0.2 cm is less than or equal to 10). "Δ": the dye receiving layer has few crystal points (the number of crystal points with diameters between about 0.2 cm and 0.5 cm is less than or equal to 2, and the number of crystal points with diameters between about 0.02 cm and 0.2 cm is less than or equal to 20). "X": the dye receiving layer has obvious crystal points (the number of crystal points with diameters larger than or equal to 0.2 cm is less than or equal to 10, and the number of crystal points with diameters between about 0.02 cm and 0.2 cm is less than 100). "XX": the dye receiving layer has severe crystal points (the number of crystal points with diameters larger than 0.2 cm is more than 10, and the number of crystal points with diameters between about 0.02 cm and 0.2 cm is more than 100).

Evaluation of Blur

The photographs printed by dye sublimation printer are placed at 70° C. for a week, and then the resolutions of the photographs are observed with naked eyes. "O": the resolution of the photograph remains the same. "Δ": the resolution of the photograph has slightly changed. "X": resolution of the photograph has a noticeable change.

Optical Density

The samples listed above are cut into printable sizes and printed by a Hiti P720 printer. The samples are printed by the ribbon (supplier: HiTi Digital, Inc.) dedicated to the Hiti P720 printer and including a dye layer of yellow dyes (Y), magenta dyes (M) and cyan dyes (C) to print yellow, magenta, cyan and full-black (K) (the energy level of the printing is 0) images. The reflective optical densities of the images are measured by an OD measuring instrument (Part No.: X-rite i1).

The dye receiving material is solid at room temperature. The dye receiving material is powdered and mixed to obtain the evenly mixed dye receiving material. After being extruded and heated up, the dye receiving layer is formed on the surface of the substrate by the lamination process. Because the dye receiving layer includes PVC, PVC-VA copolymer or a mixture thereof and the plasticizer, the molten dye receiving layer can be achieved at low temperature. In comparison with the coating processes known in the art, the lamination process does not require the use of additional solvents. There is no need to recycle solvents, and the complexity of the coating processes is avoided. The lamination process also reduces the chance of warpage. The thickness of the dye receiving layer may be controlled by different parameters, and the thickness can be even less than about 20 μm. The addition of the plasticizer having a melting point higher than 40° C. may allow the ingredients of the dye receiving material to be mixed in solid state and increase the flowability of the molten dye receiving material to obtain a more uniform distribution of the ingredients. This lowers the occurrence of the crystal points and improves the optical density.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A dye receiving sheet, the dye receiving sheet comprising a substrate and at least a dye receiving layer disposed on one side of the substrate, the dye receiving layer comprising:
   (a) polymers, wherein the polymers comprises PVC or PVC-VA copolymer or a mixture thereof, and the polymers are in an amount of 60-85 parts by weight based on a total weight of 100 parts by weight of the dye receiving layer;
   (b) a plasticizer, wherein the plasticizer has a melting point higher than 40° C., and the plasticizer is in an amount of 10-35 parts by weight based on the total weight of 100 parts by weight of the dye receiving layer, wherein the plasticizer is selected from the group consisting of alkyl citrates, hydrogenated benzene, carboxylate, benzoate, sulfonamide, sulphosuccinic acid ester, diol/polyether polyol, stearate, and a combination thereof; and
   (c) a heat stabilizer, wherein the heat stabilizer is in an amount of 2-8 parts by weight based on the total weight of 100 parts by weight of the dye receiving layer.

2. The dye receiving sheet of claim 1, wherein vinyl acetate in the PVC-VA copolymer is in an amount of 10-20 parts by weight based on the total weight of 100 parts by weight of PVC-VA copolymer.

3. The dye receiving sheet of claim 1, wherein the plasticizer is selected from the group consisting of pentaerythrityl tetrastearate (PETS), 2-Hydroxyethyl stearate and a combination thereof.

4. The dye receiving sheet of claim 1, wherein the plasticizer comprises at least a benzene ring.

5. The dye receiving sheet of any of claim 4, wherein the plasticizer comprises following chemical formula:

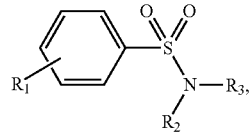

wherein R1 is H, or a straight or branched C1-C6 alkyl chain, R2 and R3 are the same or different, R2 and R3 are independently selected from the group consisting of H, a straight or branched C1-C6 alkyl chain, a C5-C8 cycloalkanes group, a straight or branched C1-C6 haloalkyl chain, a straight or branched C1-C6 hydroxy-alkyl chain, and a straight or branched C1-C6 alkyl chain with at least a substituent of C6-C14 aryl group.

6. The dye receiving sheet of any of claim 4, wherein the plasticizer is selected from the group consisting of dicyclohexyl phthalate (DCHP), diphenyl phthalate (DPP), p-toluenesulfonamide (PTSA), p-ethylbenzenesulfonamide (p-EBSA), p-propylbenzenesulfonamide (p-PBSA), p-isopropylbenzenesulfonamide, p-n-butylbenzenesulfonamide (p-n-BBSA), p-tert-butylbenzenesulfonamide, N-methyl-p-toluenesulfonamide (MTSA), N-ethyl-p-toluenesulfonamide (N-E-PTSA), N-butyl-p-toluenesulfonamide, N-cyclohexyl-p-toluenesulfonamide, 2,2-dimethyl-1,3-propanediol dibenzoate, 1,4-cyclohexane dimethanol dibenzoate, glyceryl tribenzoate, sucrose benzoate, triphenyl phosphate and a combination thereof.

7. The dye receiving sheet of claim 1, further comprising an adhesive layer, wherein the adhesive layer is disposed between the dye receiving layer and the substrate.

8. A method of fabricating a dye receiving sheet, comprising:
   providing a substrate; and
   forming the dye receiving layer as claimed in claim 1 on at least one side of the substrate by a lamination process.

9. The method of claim 8, further comprising:
   coating an adhesive layer on a surface of the substrate, the adhesive layer disposed between the substrate and the dye receiving layer.

10. The method of claim 8, further comprising:
    co-extruding an adhesive layer and the dye receiving layer onto a surface of the substrate, the adhesive layer disposed between the substrate and the dye receiving layer.

* * * * *